United States Patent
Weber et al.

(10) Patent No.: US 12,017,263 B2
(45) Date of Patent: Jun. 25, 2024

(54) METHOD FOR REMEDIATING POLYFLUOROCARBON-CONTAMINATED SOIL

(71) Applicants: Queen's University at Kingston, Kingston (CA); Her Majesty the Queen in Right of Canada, Minister of the Department of National Defence (DND), Ottawa (CA)

(72) Inventors: Kela P. Weber, Kingston (CA); Lauren Turner, Oakville (CA); Nick Battye, Belleville (CA); Bernard Kueper, Kingston (CA); Andrew Jason Hendry, Kingston (CA)

(73) Assignees: Queen's University at Kingston, Kingston (CA); Her Majesty the Queen in Right of Canada, Minister of the Department of National Defence (DND), Ottawa (CA)

( * ) Notice: Subject to any disclaimer, the term of this patent is extended or adjusted under 35 U.S.C. 154(b) by 49 days.

(21) Appl. No.: 17/601,757

(22) PCT Filed: Apr. 9, 2020

(86) PCT No.: PCT/CA2020/000051
§ 371 (c)(1),
(2) Date: Oct. 6, 2021

(87) PCT Pub. No.: WO2020/206528
PCT Pub. Date: Oct. 15, 2020

(65) Prior Publication Data
US 2022/0193738 A1 Jun. 23, 2022

(30) Foreign Application Priority Data
Apr. 10, 2019 (CA) .................................. CA 3039965

(51) Int. Cl.
B09C 1/08 (2006.01)
(52) U.S. Cl.
CPC ...................................... B09C 1/08 (2013.01)
(58) Field of Classification Search
CPC ................ B09C 1/08; B09C 1/06; B09B 3/40
See application file for complete search history.

(56) References Cited

U.S. PATENT DOCUMENTS 5,197,823 A * 3/1993 Cutshall .................... B09C 1/08
208/262.5
6,596,190 B1 7/2003 Igawa et al.
(Continued)

FOREIGN PATENT DOCUMENTS

JP 4065226 B2 3/2008

OTHER PUBLICATIONS

International Search Report and Written Opinion for corresponding international Application No. PCT/CA2020/000051 filed on Apr. 9, 2020.
(Continued)

*Primary Examiner* — Carib A Oquendo
(74) *Attorney, Agent, or Firm* — Angela Lyon; Stephen J. Scribner

(57) ABSTRACT

A method for remediating PFAS-contaminated soil comprises measuring the initial moisture content of the PFAS-contaminated soil, optionally drying the PFAS-contaminated soil, and ball milling the PFAS-contaminated soil with or without the use of milling additives.

24 Claims, 5 Drawing Sheets

(56) References Cited

U.S. PATENT DOCUMENTS

| | | | |
|---|---|---|---|
| 6,601,787 B1* | 8/2003 | Langenecker | B03B 9/00 241/38 |
| 7,431,849 B1 | 10/2008 | Swearinjen et al. | |
| 9,132,306 B2 | 9/2015 | Huang et al. | |
| 9,814,919 B2 | 11/2017 | Pancras et al. | |
| 2002/0030022 A1 | 3/2002 | Bradley | |
| 2009/0220304 A1 | 9/2009 | Ballew et al. | |
| 2011/0198071 A1 | 8/2011 | Swearinjen et al. | |
| 2018/0319685 A1 | 11/2018 | Ball et al. | |
| 2020/0155885 A1* | 5/2020 | Strathmann | A62D 3/37 |

OTHER PUBLICATIONS

Supplementary European Search Report dated Nov. 24, 2022 for corresponding European Application No. 20787367.0.

* cited by examiner

_US 12,017,263 B2_

METHOD FOR REMEDIATING POLYFLUOROCARBON-CONTAMINATED SOIL

RELATED APPLICATION

This application claims the benefit of the filing date of Canadian Patent Application No. 3,039,965 filed on Apr. 10, 2019, the contents of which are incorporated herein by reference in their entirety.

FIELD

The invention relates to remediation of contaminated soil. More specifically, the invention relates to remediation of soil contaminated with persistent, manufactured, fluorocarbon compounds, such as per- and/or polyfluoroalkyl substances.

BACKGROUND

Per- and polyfluoroalkyl substances (PFAS) represent a group of manufactured fluorinated organic compounds that have been used in industrial applications and consumer products since the 1950s. Their excellent surface-active properties, including hydrophobicity, lipophobicity and hydrophilicity have made PFAS compounds ideal for use in a number of oil and water repellent products for application in the surface treatment of textiles, leathers, fibres and carpets; in food packaging and cooking ware materials; as additives to photographic films, hydraulic fuels, electronics, surfactants, and acid mist suppressants; and in fire-fighting foams such as aqueous film-forming foams (AFFF).

AFFF are the fire suppressants to combat severe fuel fires, such as the 2013 Lac-Megantic crude oil train derailment disaster. Airports and firefighting training areas (FFTAs) have used AFFF for decades to extinguish fires and to perform training drills. PFAS compounds are highly stable and persistent in the environment, resultantly, the soils of many airports and firefighting training facilities are contaminated with PFAS. Perfluorooctane sulfonate (PFOS) and perfluorooctanoic acid (PFOA) are two of the most commonly detected, long chain (C≥8) PFAS found in AFFF contaminated soil. PFOS and PFOA have been identified as emerging contaminants of concern by the United States Environmental Protection Agency and PFOS is listed in Annex B of persistent organic pollutants by the Stockholm Convention. PFOS and PFOA are recalcitrant and resistant to conventional remediation strategies due to the strength of the carbon-fluorine bond and shielding size of fluorine atoms. Fluorinated surfactants adsorb to soil, via both hydrophobic attraction to organic carbon and electrostatic interactions from the anionic head group.

There is evidence that exposure to PFAS leads to adverse health outcomes in humans. Studies indicate that PFOA and PFOS can cause reproductive and developmental problems, liver and kidney damage, and immunological effects in laboratory animals. Both chemicals have caused tumours in animals. The most consistent findings are increased cholesterol levels among exposed populations, with more limited findings related to low infant birth weights, immune system effects, cancer (in the case of PFOA), and thyroid hormone disruption (in the case of PFOS). Significant health effects have been detected and include carcinogenic potential, endocrine disrupting properties, and neonatal immunosuppressant effects. PFAS bind to proteins so they build up in the liver and kidneys. Since these compounds are lipophobic, they do not enter fatty-tissues the way many other organic contaminants may.

PFAS impacted soil is a continuous source of contamination to groundwater, which threatens supplies of drinking water as well as ecosystems. Unfortunately, options for treating or remediating PFAS-contaminated sites are limited. Currently, practical and large-scale remedial strategies available for PFAS-contaminated soil include encapsulation, excavation to landfill (where permissible), and excavation for incineration. Encapsulation methods only act to reduce risk of exposure. Of these, only incineration destroys PFAS, but this method risks atmospheric emission of uncharacterized fluorinated by products, some of which are likely to be fluorinated greenhouse gasses. Neither encapsulation nor incineration are cost effective and both impose significant logistical and safety concerns. Consequently, there is a need for a low-risk, effective, and economically viable remediation technology to reduce the risk of PFAS-contaminated soil to communities, wildlife, and the environment.

SUMMARY

In one aspect, the invention provides a method for remediating PFAS-contaminated soil, comprising disposing PFAS-contaminated soil into a ball mill, and operating the ball mill until the PEAS-contaminated soil becomes substantially free of PFAS contaminants. In one aspect, the invention provides a method for remediating PFAS-contaminated soil, comprising disposing PFAS-contaminated soil into a ball mill, and operating the ball mill until soil that is substantially free of PFAS contaminants is obtained. In one embodiment, the method is conducted in the absence of base (e.g., KOH, NaOH). In one embodiment, the method further comprises adding drying agents to the ball mill, and rotating the ball mill until the hydration level of the PFAS-contaminated soil is in a selected range. In certain embodiments, the ball mill is a horizontal ball mill or a long roll ball mill. In one embodiment, the method further comprises disposing a plurality of milling balls in the ball mill prior to rotating the ball mill. In one embodiment, the method further comprises disposing a gas into the ball mill. In one embodiment, the gas is continuously disposed into the ball mill while the ball mill is rotating. In one embodiment, the gas is air, argon, nitrogen, helium, or a combination thereof. In one embodiment, the disposing of a plurality of milling balls occurs once the PFAS-contaminated soil has a selected hydration level. In one embodiment, the method further comprises disposing a milling additive in the ball mill. In one embodiment, the milling additive comprises a co-milling agent, a drying additive, or a combination thereof. In one embodiment, the co-milling agent comprises potassium hydroxide (KOH), sodium hydroxide (NaOH), calcium oxide (CaO), silicon dioxide ($SiO_2$), talc, aluminum oxide ($Al_2O_3$), sand or a combination thereof. In one embodiment, the drying additive comprises sodium chloride, calcium chloride, sodium hydroxide, copper sulphate, phosphorus pentoxide, potassium hydroxide, silica gel, lithium bromide, lithium chloride, or a combination thereof. In one embodiment, the method further comprises removing debris and bulk natural organic and inorganic matter from the PFAS-contaminated soil prior to transferring the PFAS-contaminated soil to the ball mill. In one embodiment, the co-milling agent may be a defluorination agent that is added to PFAS-contaminated soil in a ratio of about 0:1 to about 1:1. In one embodiment, the milling balls are added in a mass ratio of milling balls to PFAS-contaminated soil of about 20:1. In one embodiment, the PFAS-contaminated soil comprises perfluoroalkyl substances.

In one embodiment, the PFAS-contaminated soil comprises polyfluoroalkyl substances. In one embodiment, the PFAS-contaminated soil comprises PFBA (perfluorobutanoic acid), PFBS (perfluorobutanesulfonic acid), PFBzA (pentafluorobenzoic acid), PFDA (perfluorodecanoic acid), PFDoA (prefluorododecanoic acid), PFHpA (perfluoroheptanoic acid), PFHxA (perfluorohexanoic acid), perfluorohexanesulfonic acid (PFHxS), PFHxS (perfluorohexanesulfonic acid), PFNA (perfluorononanoic acid), PFOA (perfluorooctanoic acid), PFOS (perfluorooctanesulfonic acid), PFOSA (perfluorooctanesulfonamide), PFPeA (perfluoropentanoic acid), and PFUnA (perfluoroundecanoic acid), fluorotelomer, or any combination thereof. In one embodiment, the fluorotelomer comprises 6:2 fluorotelomer sulfonate (FTS). In one embodiment, the PFAS substances are present in the PFAS-contaminated soil in a range of about 0.5 parts per billion (ppb) to about 40 parts per million (ppm). In one embodiment, the PFAS substances are present in the PFAS-contaminated soil in an amount of about 5 ppm. In one embodiment, the remediation is conducted in the absence of a hydroxide base (i.e., with no added KOH nor NaOH). In one embodiment, the remediation is conducted in the presence of a hydroxide base selected from KOH, NaOH, or a combination thereof. In one embodiment, soil comprises bulk natural inorganic matter, bulk natural organic matter, solid material, porous material, concrete, asphalt, or granular activated carbon materials.

BRIEF DESCRIPTION OF THE DRAWINGS

For a better understanding of the invention and to show more clearly how it may be carried into effect, reference will now be made, by way of example, to the accompanying drawings, wherein.

DETAILED DESCRIPTION OF EMBODIMENTS

Definitions

Figure 1:
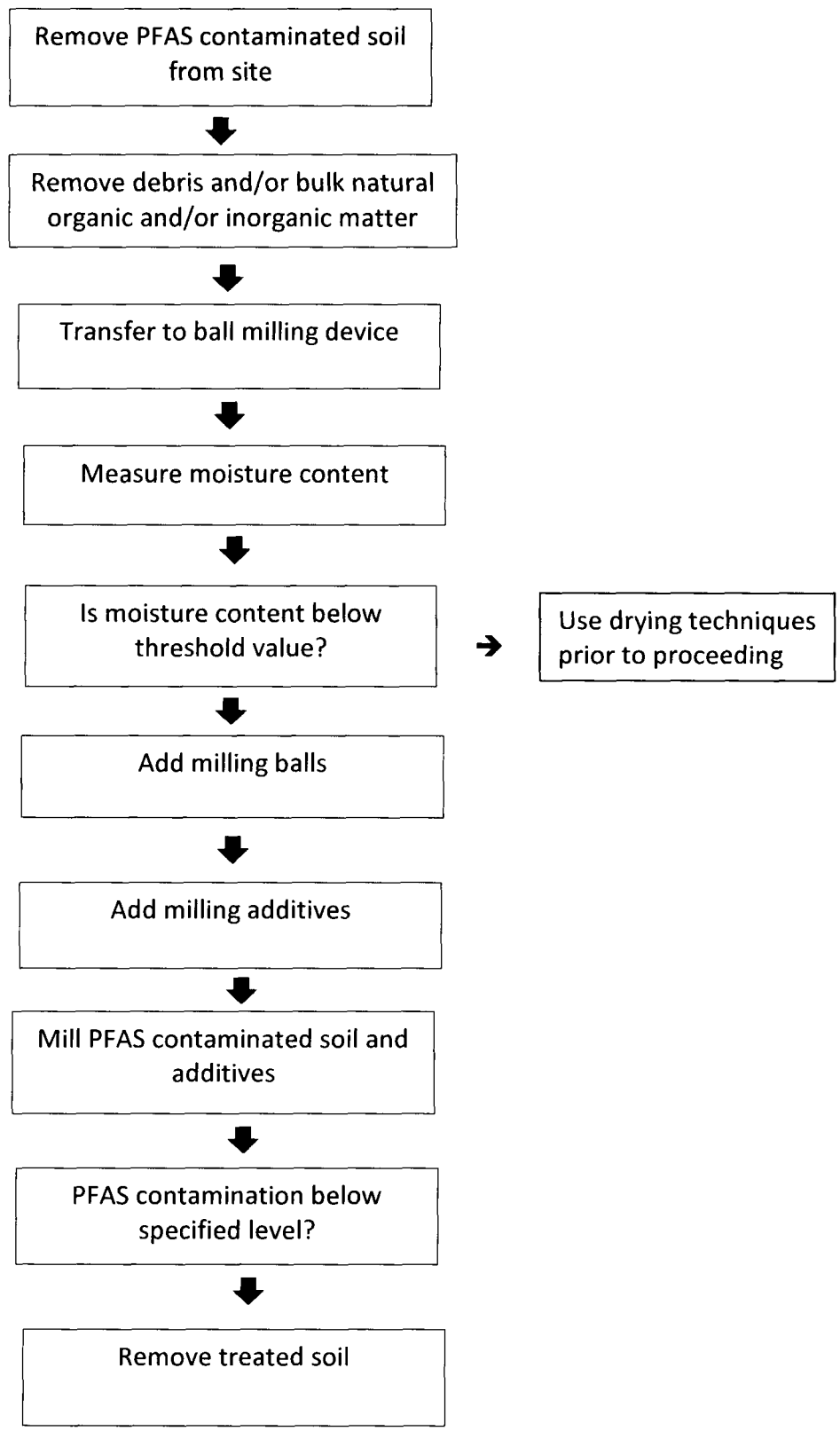
FIG. 1 shows a flowchart outlining embodiments of the invention.
Figures 2A, 2B, 2C, 2D, 2E, 2F, 2G, 2H:
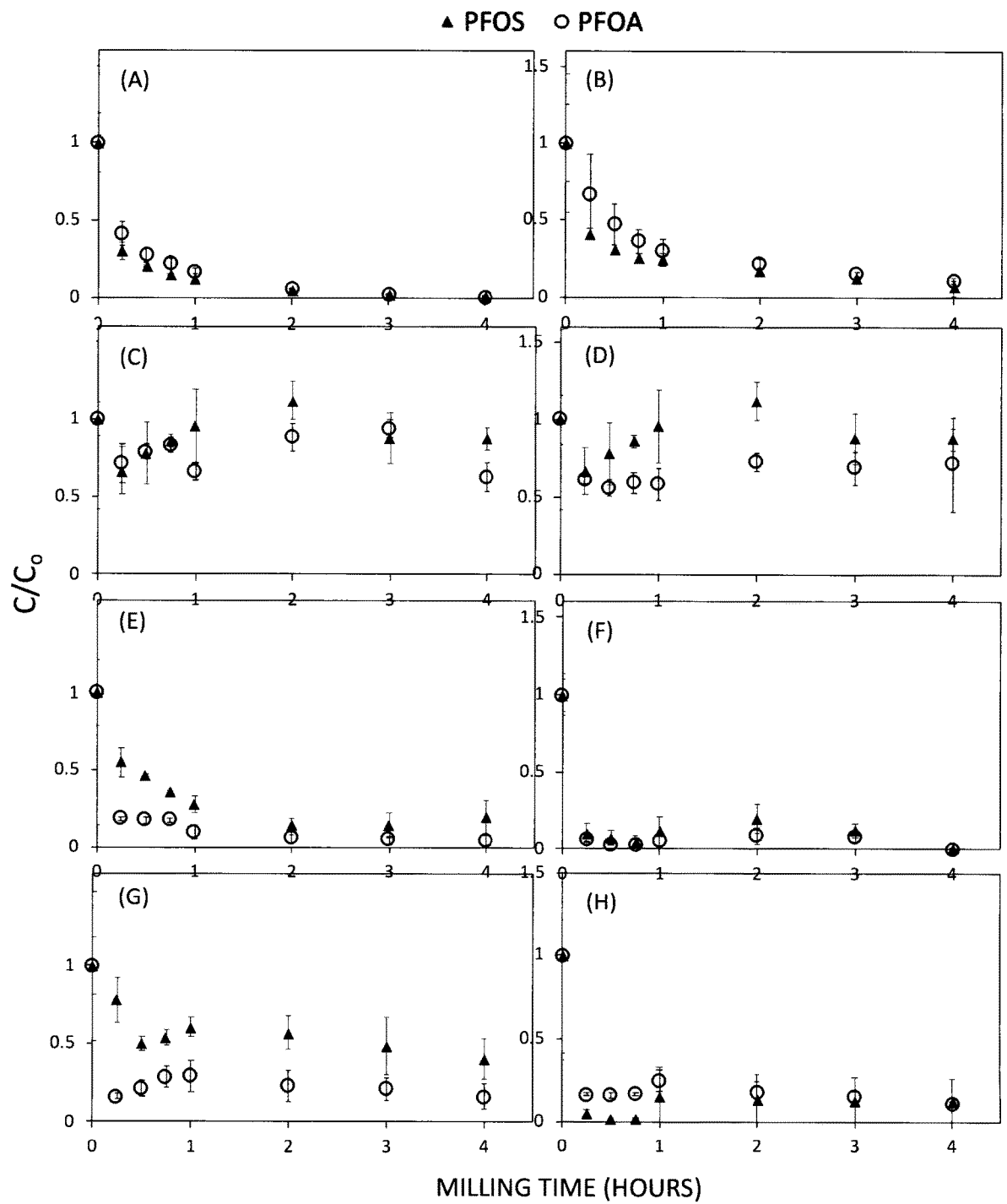
FIG. 2A shows normalized degradation profiles for 15 g of dry contaminated sand having no KOH additive, where the contamination is PFOS (▲), or PFOA (●).
FIG. 2B shows normalized degradation profiles for 40 g of dry contaminated sand having no KOH additive, where the contamination is PFOS (▲), or PFOA (●).
FIG. 2C shows normalized degradation profiles for 15 g of water-saturated contaminated sand having no KOH additive, where the contamination is PFOS (▲), or PFOA (●).
FIG. 2D shows normalized degradation profiles for 40 g of water-saturated contaminated sand having no KOH additive, where the contamination is PFOS (▲), or PFOA (●).
FIG. 2E shows normalized degradation profiles for 15 g of dry contaminated sand having KOH additive (10 g), where the contamination is PFOS (▲), or PFOA (●).
FIG. 2F shows normalized degradation profiles for 40 g of dry contaminated sand having KOH additive (10 g), where the contamination is PFOS (▲), or PFOA (●).
FIG. 2G shows normalized degradation profiles for 15 g of water-saturated contaminated sand having KOH additive (10 g), where the contamination is PFOS (▲), or PFOA (●).
FIG. 2H shows normalized degradation profiles for 40 g of water-saturated contaminated sand having KOH additive (10 g), where the contamination is PFOS (▲), or PFOA (●).

As used herein, the term "soil" refers generally to any solid or porous material or media that may be contaminated with PFAS and may be treated according to the methods described herein. Soil may comprise bulk natural inorganic matter and/or bulk natural organic matter. Soil may comprise solid or porous material that is not naturally-occurring, such as concrete, asphalt and granular activated carbon materials.

As used herein, the term "bulk natural inorganic matter" refers to matter that is not derived from animal or plant origins found within natural terrestrial environments, such as boulders, rocks, gravel, sand, clay, stones, sediment, etc.

As used herein, the term "bulk natural organic matter" refers to matter derived from animal or plant origins found within natural terrestrial environments, such as trees, plants, grasses, root materials, humus, etc.

As used herein, the term "co-milling agent" refers to a material that forms surface plasmas upon the breakage of certain intramolecular bonds. Such material may assist with defluorination of fluorinated compounds such as PFAS compounds, examples of co-milling agent (i.e., defluorination agents) include, but are not limited to, potassium hydroxide (KOH), sodium hydroxide (NaOH), and calcium oxide (CaO), sand, granite, quartz porphyries, feldspar, talc, aluminum oxide, KOH, NaOH, $SiO_2$, porphyries, or a combination thereof.

As used herein, the term "hygroscopic substance" refers to a substance that readily attracts water from its surroundings, through either absorption or adsorption.

As used herein, the term "PFAS" generally refers to per- and polyfluoroalkyl substances.

As used herein, the term "PFAS-contaminated soil" refers to soil that has been contaminated with per- and/or polyfluoroalkyl substances.

As used herein, the term "PFAS-contaminated site" refers to an area of land that has per- and/or polyfluoroalkyl substances in its surface and subsurface soils, sediments, aquifer materials, and/or groundwater.

As used herein, the term "perfluoroalkyl substance" refers to a class of manufactured fluorinated hydrocarbon chemicals that are fully fluorinated.

As used herein, the term "polyfluoroalkyl substance" refers to a class of manufactured fluorinated hydrocarbon chemicals that are not fully fluorinated.

As used herein, the term "QL" refers to quantification limit meaning the lowest quantity of a substance that can be distinguished from the absence of that substance.

As used herein, the term "treated soil" refers to PFAS-contaminated soil that has been treated or remediated such that the level of PFAS contamination in the soil is less than it was prior to being treated or remediated.

EMBODIMENTS

Methods for remediating soil that is contaminated with PFAS are described herein. Embodiments degrade, destroy, and/or alter PFAS in the soil such that resulting treated soil has substantially no PFAS and may conform with local guidelines for PFAS contamination. As used herein, the term "PFAS" is used as a general term to represent perfluoroalkyl or polyfluoroalkyl substances. Such substances include perfluorooctanesulfonic acid (PFOS), perfluorooctanoic acid (PFOA), perfluorooctanesulfonamide (PFOSA), perfluorohexanoic acid (PFHxA), perfluoropentanoic acid (PFPeA), pentafluorobenzoic acid (PFBzA), perfluorobutanoic acid (PFBA), perfluorohexanesulfonic acid (PFHxS), perfluorobutanesulfonic acid (PFBS), perfluorodecanoic acid (PFDA), prefluorododecanoic acid (PFDoA), perfluoroheptanoic acid (PFHpA), perfluorononanoic acid (PFNA), perfluoroundecanoic acid (PFUnA), fluorotelomer, or any combination thereof. In one embodiment, the fluorotelomer comprises fluorotelomer sulfonate (FTS).

In one embodiment, the PFAS substances are present in the PFAS-contaminated soil in a range of about 0.5 parts per billion (ppb) to about 40 parts per million (ppm). In one embodiment, the PFAS substances are present in the PFAS-contaminated soil in an amount of about five parts per million (ppm).

Results described herein show that the methods are effective for a variety of soil types (e.g., soils including sand and clay) and for a range of contamination levels and types of PFAS. As described in the Examples, PFAS-spiked sand samples as well as samples of soils that were retrieved from a site known to be contaminated with AFFF were remediated using the methods and resulted in significant reductions in the levels of PFAS-contamination in the soils being treated.

In accordance with embodiments, PPFAS-contaminated soil may be removed from a PFAS-contaminated site by manual shoveling, excavation using a machine (i.e., backhoe, excavator, bulldozer), hydro excavation, etc. Debris and/or large bulk natural organic and/or inorganic matter, such as trees, plants, grasses, root material, humus, boulders, rocks, stones, etc., that may be present in the PFAS-contaminated soil may be removed by manual extraction, sifting, filtering, etc. After removal of such debris, the PFAS-contaminated soil is transferred into a ball milling device.

In one embodiment, PFAS-contaminated soil is tested to determine its moisture content. Techniques for determining moisture content include gravimetric measurement, frequency domain reflectometry, time domain transmission, time domain reflectometry, soil resistivity, neutron moisture gauges, and galvanic cells. For soil that has a high hydration level, drying the soil to a lower hydration level has been shown to improve the efficiency of the subsequent remediation process. In one embodiment, the soil is disposed in a ball mill, and then the hydration level is determined. Once the hydration level is determined, if the hydration level is quite high, then the hydration level is lowered by drying the soil either partially or fully.

There are several techniques to dry soil that can be used, alone or in combination. These include, for example, adding drying agents to the ball mill, rotating the ball mill until the hydration level of the soil is reduced, flowing a gas through the ball mill as it is rotated, and heating the soil as it is rotated in the ball mill. Examples of drying agents include: sodium chloride, calcium chloride, sodium hydroxide, copper sulphate, phosphorus pentoxide, potassium hydroxide, silica gel, lithium bromide, lithium chloride, or any combination thereof. In one embodiment, soil is allowed to air dry.

If the hydration level is above a threshold level, the PFAS-contaminated soil is first dried in, or outside of, the ball milling device. Drying can be done by milling the PFAS-contaminated soil (in the absence of milling balls) for a specified period of time or until the moisture content of the PFAS-contaminated soil falls below the threshold level. Optionally, a gas is introduced into the ball milling device to accelerate the rate of drying. Examples of suitable gases include, but are not limited to, air, nitrogen, argon, and helium. The gas can be heated if even faster drying rates are desired. Once the moisture level of the PFAS-contaminated soil is below the threshold level, the milling process proceeds until a specified PFAS contamination target level is achieved.

In one embodiment, a drying additive is added to the ball milling process. As shown in FIGS. 2A-2H, the addition of a hygroscopic substance (e.g., potassium hydroxide (KOH)) has a significant impact on the effectiveness of ball milling on remediating PFAS-contaminated soil that has an initial moisture content above the threshold level. In this embodiment, there is no separate drying step (although such a step is optional), rather, the drying additive is added to the PFAS-contaminated soil prior to and/or during the ball milling process and acts to reduce the moisture content of the PFAS-contaminated soil through hygroscopy. Examples of suitable drying agents include, but are not limited to, sodium chloride, calcium chloride, sodium hydroxide, copper sulphate, phosphorus pentoxide, potassium hydroxide, silica gel, lithium bromide, and lithium chloride.

As shown in FIGS. 2A to 2H, the effectiveness of ball milling on treating or remediating PFAS-contaminated soil is affected by the initial moisture content of the PFAS-contaminated soil. Consequently, in one embodiment, a moisture content of the PFAS-contaminated soil is determined prior to remediation as this will inform subsequent processing conditions. When the initial moisture content of the PFAS-contaminated soil is below a certain threshold level, remediation by ball milling can proceed without any additional steps or additives.

Following an optional drying step, a remediation step is performed wherein the ball mill is operated until the PFAS-contaminated soil becomes treated soil that has substantially no PFAS-contamination (e.g., 99% or greater reduction from initial levels). Thus, as used herein, remediation refers to a reduction of amount of PFAS in a sample to a level that meets or exceeds local guidelines (see, e.g., Table 1 of Milley, S. A., et al., Journal of Environmental Management 222:122-131, 2018). Ball milling devices include horizontal ball mill, planetary ball mill, high-energy ball mill, and industrial ball mill devices. In one embodiment, the ball mill is a horizontal ball mill. In one embodiment, remediation is conducted by rotating the soil in the absence of milling balls, until the soil is remediated. In another embodiment, a plurality of milling balls is added to the ball mill and then the ball mill is rotated. In one embodiment, milling balls are added to the ball milling device so that a ratio of mass of milling balls to mass of PFAS-contaminated soil, which may include milling additives, was about 20:1. A suggested charge ratio (i.e., mass of milling balls to mass of PFAS-contaminated soil, which includes any milling additives) is about 30:1, preferably about 20:1. Once rotation of the ball mill starts, it proceeds for a specified period of time or until testing of the PFAS-contaminated soil demonstrates a reduced level of PFAS contamination. Once a target low level of contamination is reached the remediated soil is removed from the ball mill and, if drying agent was used, optionally the drying agent is separated from the treated soil.

Although not wishing to be bound by theory, the inventors suggest that ball milling breaks up PFAS compounds and forms compounds, atoms, and/or ions that are less hazardous. HPLC-MS/MS (e.g., triple quadrupole MS) may be used to confirm the absence of PFAS compounds in remediated soil. Fluoride and other ions have been shown to be present in the remediated soil.

In another embodiment, a co-milling agent is added to the PFAS-contaminated soil prior to or during the ball milling process to promote remediation of the PFAS-contaminated soil. Without wishing to be bound by theory, it is believed that a mechanism of PFAS destruction involves the mechanical breaking of high energy intramolecular bonds which generate reactive surface plasmas that react with the C—F bonds of the PFAS compound, initiating a decomposition reaction that results in defluorination. Consequently, remediation of PFAS-contaminated soil can be accelerated by promoting this destruction mechanism. This acceleration can be accomplished by adding to the ball milling device one or more surface plasma forming additives, referred to herein as co-milling agents. Examples of suitable co-milling agents include, but are not limited to, sand, granite, quartz porphyries, feldspar, talc, KOH, NaOH, and aluminum oxides. In this embodiment, the milling process proceeds until a specified PFAS-contamination target level is achieved. The treated soil is then removed from the ball mill and, optionally, the co-milling agent is separated from the treated soil.

In another embodiment, a co-milling agent is added to the PFAS-contaminated soil prior to and/or during the ball milling process to assist or promote the treatment or remediation of the PFAS-contaminated soil. Without wishing to be bound by theory, it is believed that a mechanism of PFAS destruction involves defluorination through nucleophilic attack by hydroxides. Consequently, the treatment or remediation of PFAS-contaminated soil can be accelerated by promoting this destruction mechanism. This can be accomplished by adding to the ball milling device one or more co-milling agents. In one embodiment, a ratio of the mass of co-milling agent to mass of PFAS-contaminated soil is between 0:1 and 1:1. Examples of suitable co-milling agents include, but are not limited to, potassium hydroxide, calcium oxide, silicon dioxide, sodium hydroxide, and iron oxides. To avoid high pH levels in the remediated soil, which could turn the treated soil itself into a hazardous material and preclude its future use, the ratio of the mass of the co-milling agent to the mass of the PFAS-contaminated soil should be in the range of about 1:1, to about 0.5:1. Milling proceeds until a specified PFAS-contamination target level is achieved. The treated soil is then removed from the ball mill and, optionally, the co-milling agent is separated from the treated soil.

Referring to FIG. 1, a flowchart is shown depicting steps of an embodiment of the remediation method described herein.

FIGS. 2A-H show profiles for samples (15 g or 40 g) of PFOS- or PFOA-contaminated sand that is either dry or water-saturated and that are in the absence or presence of 10 g of KOH additive. All samples had a starting concentration of 5 mg/kg either PFOS or PFOA. It is noted that in FIG. 2F, the amount of PFAS remaining after four hours of milling time was below the detection limit of 0.001 mg/kg.

Figure 3:
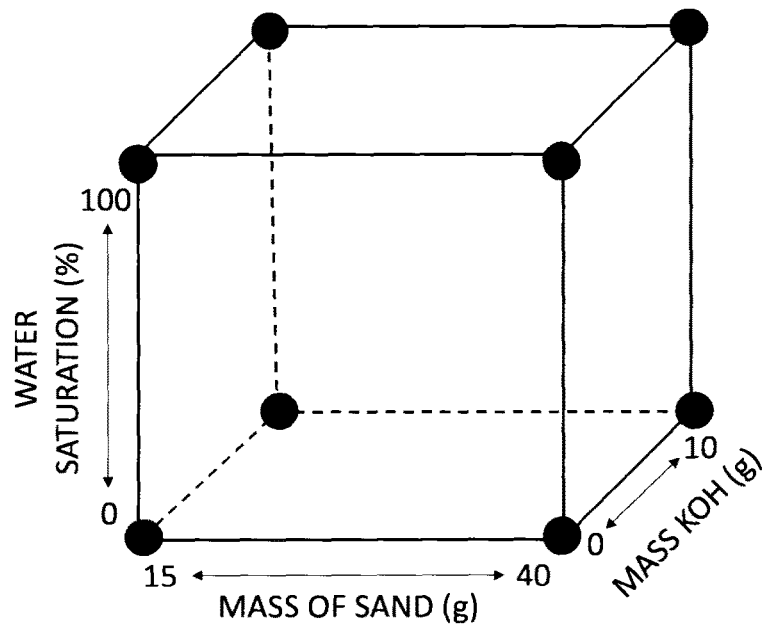
FIG. 3 shows a geometric view of the 23 factorial experimental design, presenting the mass of sand (g), mass of KOH (g) and hydration level (%) on the x, y and z axes, respectively.

Referring to FIG. 3, a geometric view is shown of a $2^3$ factorial experimental design, presenting the mass of sand (g), mass of KOH (g) and hydration level (%) on the x, y and z axes, respectively.

Figure 4:
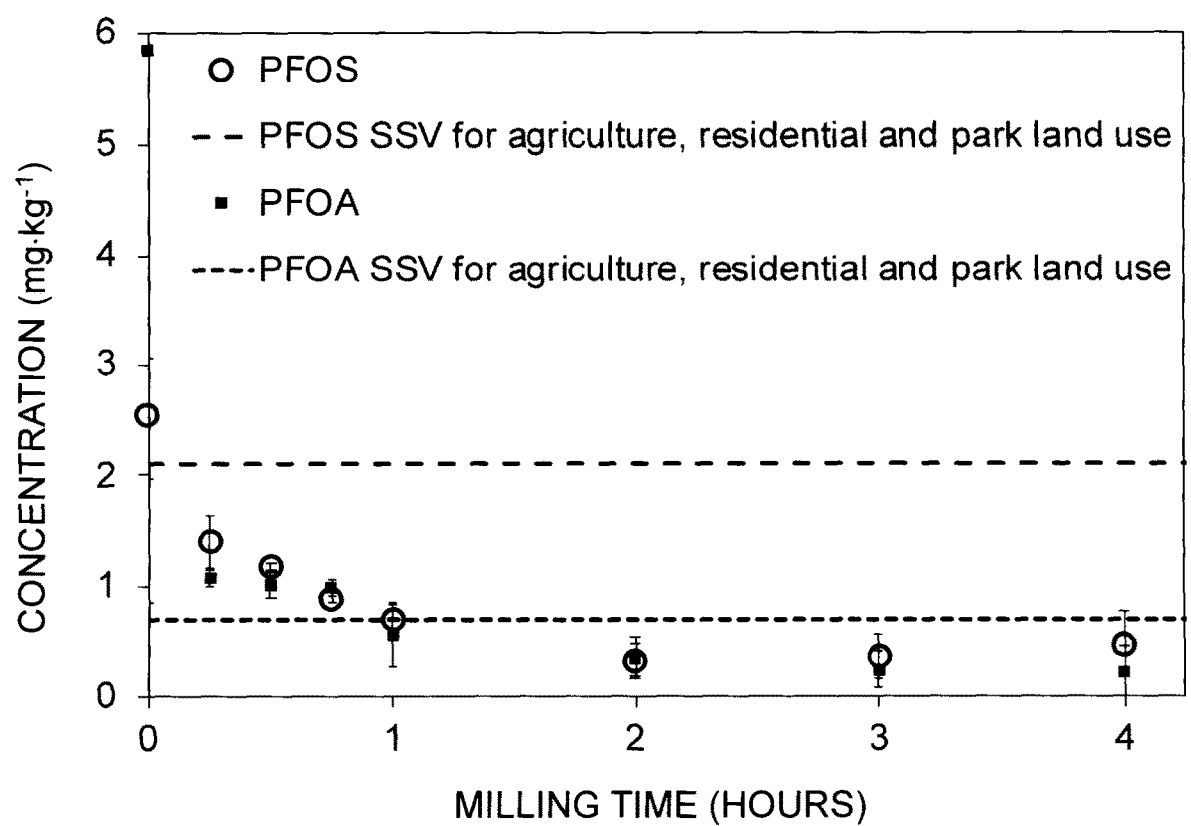
FIG. 4 shows a graph of concentration of various PFAS compounds vs. milling time for 15 g dry spiked sand in the presence of 10 g KOH.

Referring to FIG. 4, a graph is shown to compare results of the absence and presence of KOH as a co-milling reagent in remediating PFAS spiked sand. It was evaluated without KOH pellets and a high level (10 g) of KOH pellets. KOH pellets (available from J. T. Baker, 87.5%) were used at a KOH:PFAS mass ratio of >20:1, assuming the initial concentration of PFAS spiked sand was 5 mg/kg. Water saturation studies were conducted to investigate the impact of fluid filled pore space. Dry (0% deionized water content) and fully saturated (100% deionized water content) were selected as the low and high levels, respectively.

Figures 5A, 5B:
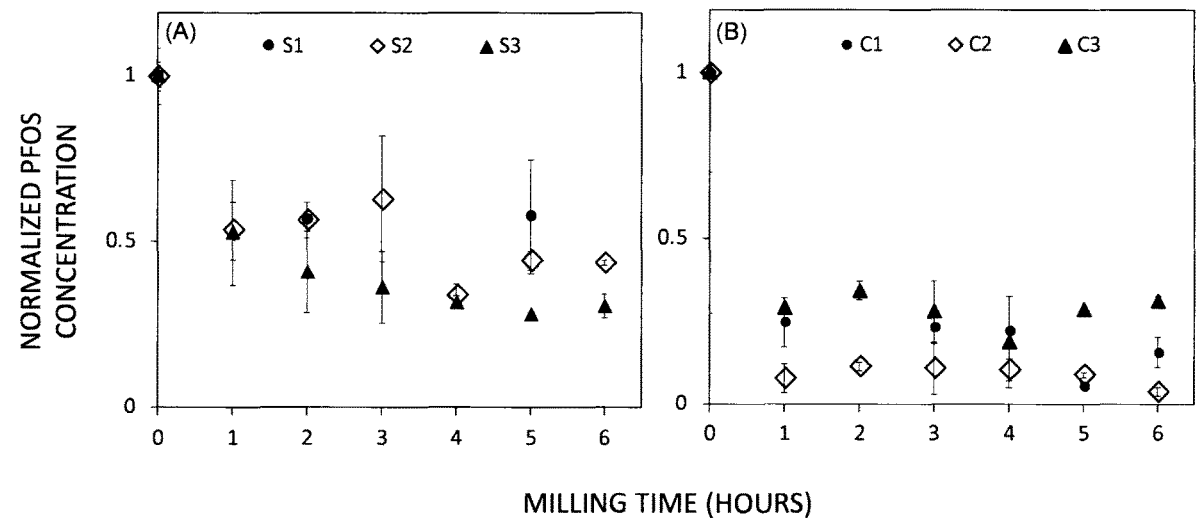
FIGS. 5A and 5B show destruction profiles for (A) AFFF impacted sands (B) AFFF impacted clays.

Referring to FIGS. 5A and 5B, destruction profiles are shown for (A) AFFF contaminated sands and (B) AFFF contaminated clays (see Table 2 for details).

Figure 6:
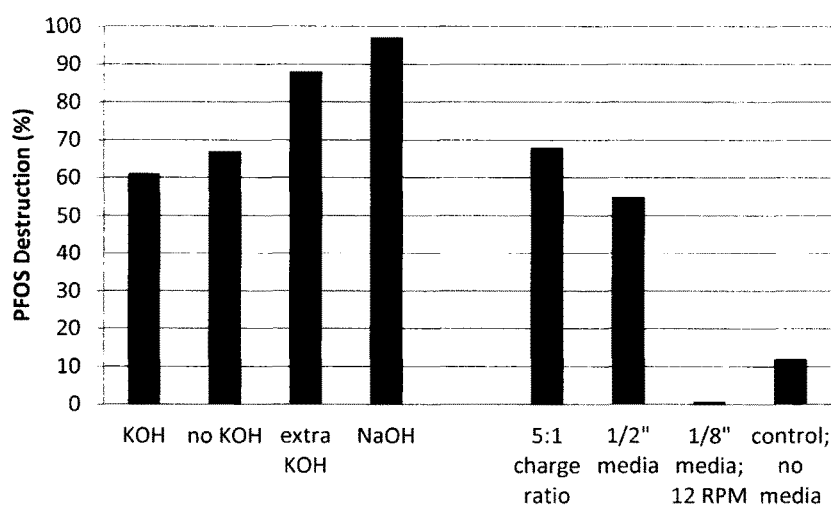
FIG. 6 shows a plot of percentage PFOS destruction versus treatment parameters for FFTA sand using a long roll ball mill (ball mill parameters included sand, a grinding ball size of 2.86 cm, a charge ratio of 10:1, a reagent ratio of 4:1 (sand:KOH), and a speed of 47 RPM).

Referring to FIG. 6, a plot is shown of percentage PFOS destruction versus treatment parameters for FFTA sand using a long roll ball mill (ball mill parameters included sand, a grinding ball size of 2.86 cm, a charge ratio of 10:1, a sand to co-milling agent ratio of 4:1 (sand:KOH), and a speed of 47 RPM).

Figure 7A:
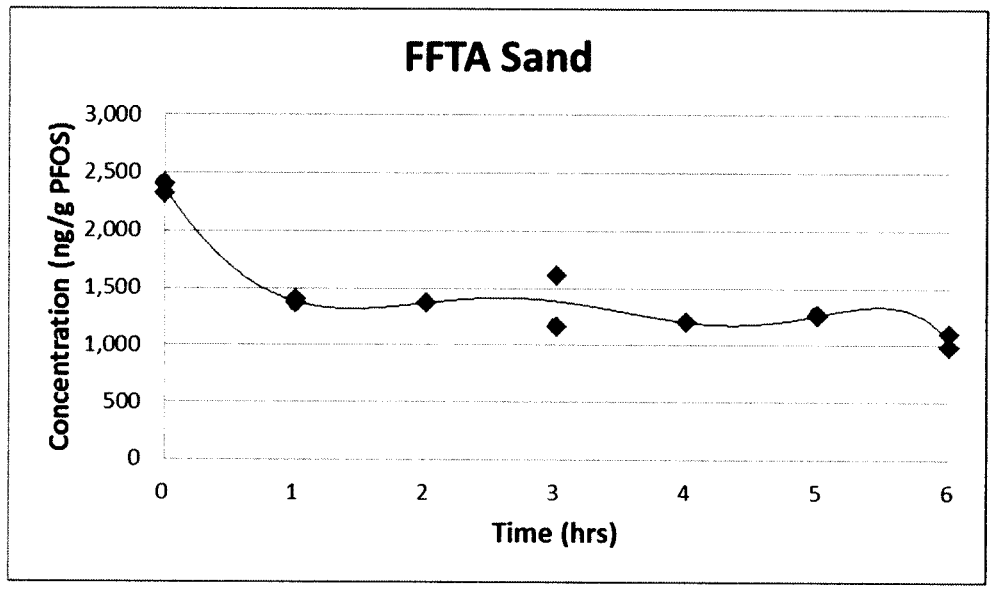
FIG. 7A shows a plot of concentration PFOS versus ball milling time in FFTA sand using a unitized ball mill.
Figure 7B:
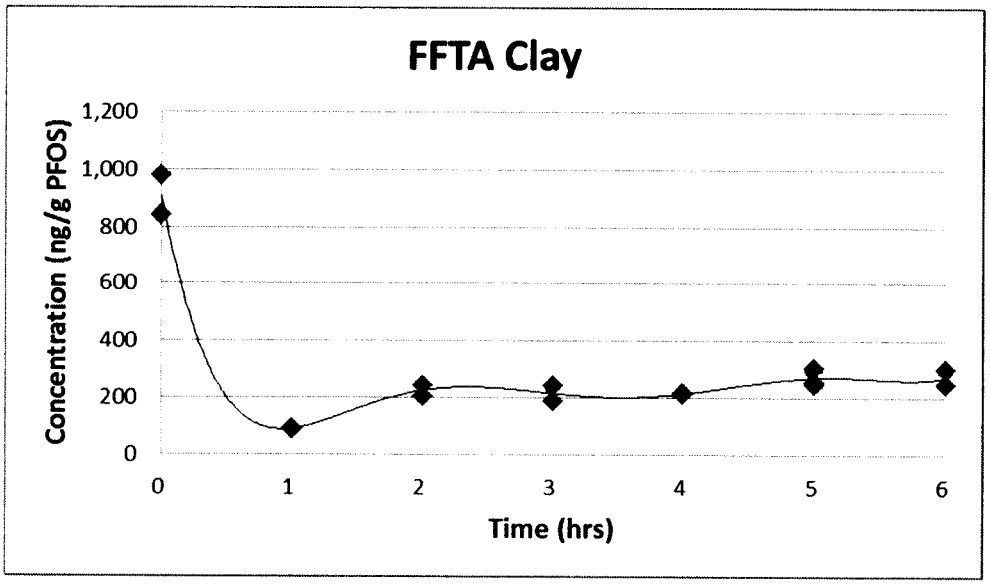
FIG. 7B shows a plot of concentration PFOS versus ball milling time in FFTA clay using a unitized ball mill.

Referring to FIGS. 7A and 7B, plots are shown of concentration PFOS versus ball milling time in FFTA sand and clay using a unitized ball mill. The majority of PFOS destruction occurred within the first hour and was reduced below Canadian human health soil screening guidelines for agriculture/residential/parkland land use (3,200 ng/g)(see Health Canada, Updates to Health Canada Soil Screening Values for Perfluoroalkylated Substances (PFAS), 2017).

The following working examples further illustrate the invention and are not intended to be limiting in any respect.

WORKING EXAMPLES

Example 1. Remediation of Environmental Levels of PFOS and PFOA-Contaminated Soil PFOS and PFOA destruction was evaluated using a $2^3$ factorial design to permit the analysis of main factor and interaction effects. Milling experiments for eight treatment configurations were performed in duplicate and sampled in duplicate for each of PFOS and PFOA separately. Milling trials were carried out at 275 rpm for 4 hours in a bench top planetary ball mill (Retsch PM 100 with a 250 mL stainless steel grinding jar and ninety 10 mm and ten 15 mm stainless steel grinding balls (total mass 495 g). Samples were collected every 15 minutes within the first hour, and then sampled hourly for the remainder of milling.

Charge ratios of approximately 20:1 (for 15 g spiked sand samples) and 10:1 (for 40 g spiked sand samples) were selected. Sand types were not varied, however, the nature of the sand chosen mimics an environmentally relevant material with a diverse mineralogy. Potassium hydroxide (KOH) as a co-milling agent was evaluated by remediating samples without KOH pellets and with a high level of 10 g KOH pellets. KOH pellets (J. T. Baker 87.5%) were used at a KOH:PFAS mass ratio of >20:1, assuming the initial concentration of spiked sand was 5 mg/kg.

A dry scenario with 0% deionized water content and fully saturated scenario with 100% deionized water content, were selected as the low and high levels of moisture, respectively.

Nepheline syenite sand (20/40) (Unimin Canada Ltd. CAS #37244-96-5, $Al_2KNaO_8Si_2$, porosity 0.43, dry bulk density 1.46 g/cc) was acid washed following procedures used by (Van De Ven and Mumford 2018; Yee, Fein, and Daughney 2000) to remove impurities and fines. The resulting clean sand was dried at 60° C. for 48 hours. Sand was spiked to approximately 5 mg·kg$^{-1}$ PFOS or PFOA using solutions made from reagent grade PFOS (97%, CAS #1763-23-1) and PFOA (98%, CAS #335-67-1) purchased from Synquest Laboratories. As shown in Table 1, PFOS and PFOA concentrations were reduced by 98% and 99%, respectively, by 4 hours of milling without the addition of a co-milling agent. PFOS and PFOA concentrations were reduced by 99% with the addition of KOH by 4 hours of milling.

Example 2. Remediation of Highly Contaminated Samples of PFOS Contaminated Soil

PFOS-spiked nepheline syenite sand at approximately 35 mg·kg$^{-1}$ was milled following the same procedure as outlined in Example 1. Higher concentration experiments were conducted with the objective to quantify fluoride concentrations recovered after post milling. Up to 89% of theoretical yield of fluoride was recovered after milling of PFOS-spiked sand indicating full defluorination of PFOS occurred (see Table 4).

Example 3. Remediation of AFFF Soil Samples

AFFF contaminated soils were obtained from an unlined (i.e., absence of a liner) firefighting training area (FFTA) where fuel based fires had been extinguished for over 50 years. PFOS was the highest concentration PFAS detected in the FFTA soils. Aside from PFOS, the FFTA was known to have been impacted by other perfluorocarboxylic acids (PFCAs), perfluorosulfonic acids (PFSAs), petroleum hydrocarbons, fluorotelomer sulfonates and fluorotelomer alcohols.

Three sands and three clays of a predicted low, moderate and high concentration, from a FFTA were examined. FFTA sands identified as S1, S2, and S3 were retrieved directly from storage without drying, and had approximately 20% water saturation level. These samples provided examples of environmentally relevant, site-like conditions. FFTA clays, identified as C1, C2, and C3 were dried in a fume hood for two days to eliminate residual moisture to reduce predicted caking. Milling conditions were the same as reported in Example 1. Results are shown in Tables 2 and 3.

Example 4. Remediation Using a Long Roll Jar Mill

A long roll jar mill (model 803DVM, Norstone, Inc., Bridgeport, Pennsylvania) was used. The 803DVM is a 3-tier model, with each roll measuring 121.92 cm in length. The overall length of the mill is 144.15 cm, the overall width is 41.91 cm, and the overall height is 153.67 cm.

Grinding media (purchased from Norstone) were 52100 chrome steel, in the following sizes: ⅛" (3.175 mm), ¼" (6.35 mm), ⅜" (9.525 mm), ½" (12.7 mm), ¾" (19.05 mm), and 1⅛" (28.575 mm).

Unlined stainless steel (Type 304) grinding jars with internal lifter bars (model 611L, from US Stoneware, East Palestine, Ohio) were used. The jar size is classified as "6"; these jars have a 36.20 cm diameter, a 26.67 cm height (34.29 overall height including the locking mechanism), and a 20.32 cm opening. The corresponding internal volume is 25 L+/−5%. The weight of each jar is 10.89 kg.

PFAS-contaminated soil samples as described above were remediated using the long roll jar mill. FIGS. 6 and 7A, 7B show the results.

Example 5. Analytical Methods

Solid Sample Extraction

Initial sand and sediment samples were extracted in basic (0.1% NaOH) high performance liquid chromatography (HPLC) grade methanol (CAS 67-56-1). Every 10 samples were spiked with 0.02 uL mass-labelled surrogate. Samples were vortexed for 10 seconds and agitated on an end-over-end shaker at 65 rpm for 30 minutes. Samples remained in solvent overnight. After sitting overnight, samples were vortexed for 30 seconds. Samples were then centrifuged at 4,000 rpm for 10 minutes to settle suspended soils and left to sit for a minimum of 5 minutes. Samples were filtered through a Whatman 0.45 um glass microfiber filter into a sterile, pre-weighed 15 mL centrifuge tube. Sample pH was measured with litmus paper and adjusted to pH 10-12 with 10% sulfuric acid, when required. A 750 uL aliquot of the sample was transferred to a pre-weighed HPLC vial. Each vial was then spiked with 10 uL of either PFDoA (for the spiked sand experiments) or mass-labelled surrogate (for the FFTA soil experiments) as an internal standard to track HPLC-mass spectrometer (MS) drift.

Subsequent solid samples were extracted in basic (1% w/w ammonium hydroxide) high performance liquid chromatography (HPLC) grade methanol (CAS 67-56-1). Basic methanol (10 mL) was added to ~0.5 g of solid sample, vortexed for 30 seconds and agitated via shaker for 24 hours, then centrifuged at 2000 RPM for 20 minutes. A mL aliquot of the supernatant was transferred to a HPLC vial. Every tenth vial was spiked with 100 ⍰ L of PFDoA as an internal standard to track HPLC-mass spectrometer (MS) drift. Additionally, one of every ten samples were spiked with mass-labelled surrogates before extraction to track extraction efficiency. Concentrations were not corrected based on mass-labelled surrogates as recoveries were between (97-103% in all cases).

Sample Analysis

Samples were analyzed directly (without cleanup) via LC-MS/MS utilizing multiple-reaction-monitoring (MRM) mode. The MRM method used analyzed the samples for PFBuA (perfluorobutanoic acid), PFBS (per-fluorobutane-sulfonic acid), PFDA (perfluorodecanoic acid), PFDoA (per-fluorododecanoic acid), PFHpA (per-fluoroheptanoic acid), PFHxA (perfluorohexanoic acid), PFHxS (perfluorohexane-sulfonic acid), PFNA (perfluo-rononanoic acid), PFOA (per-fluorooctanoic acid), PFOS (perfluorooctanesulfonic acid), PFOSA (perfluorooc-tanesulfonamide), PFPeA (perfluoro-pentanoic acid), PFUnA (perfluoroundecanoic acid). Calibration standards for PFOS/PFOA were prepared using basic methanol.

LC-MS/MS Analysis

Liquid chromatography was performed on an Agilent 1260 Infinity Series Bio-Inert HPLC system using two mobile phases, HPLC-grade water with ammonium acetate (2 mM) and methanol with ammonium acetate (2 mM), with gradient delivered at a flow rate of 0.4 mL/min. A 10 uL injection volume was used. A Zorbax Eclipse Plus C18 Column was used in conjunction with a paired guard column. Initial eluent conditions were 94% water and 6% methanol. The percent methanol was ramped up to 100% until 6 minutes, held at 100% until 8 minutes, ramped down until 11 minutes, and the system was given 4 minutes post-run to re-equilibrate the mobile phase and pressure flow.

An Agilent 6460 Triple Quadrupole Mass Spectrometer operating in negative electrospray ionization mode using a multiple reaction monitoring (MRM) method was employed for sample analysis. Two MRM transitions were acquired for all possible analytes, but some analytes only had single transitions available. The dwell time for each transition was 120 ms. The monitored transitions were analyte dependent and were the same or similar to those used previously for the aforementioned suite of 13 PFAS.

Optimal instrumental source parameters were determined and are as follows: ion spray voltage, 4,000*V; curtain gas flow, 35 arbitrary units (au); nebulizer gas flow, 50 au; turbo gas flow, 50 au; medium collision gas flow; and source temperature, 650° C. Nitrogen provided by a NitroFlow Gas Generator System was used for the nebulizer and drier gas, and a nitrogen tank was used as the curtain and collision gas.

Quantitation was performed using Masshunter Quantitation Software with calibration curves generally having $r^2$ values greater than 0.99. Limits of quantitation were analyte, matrix, and run-dependent but were approximately 1 ng/g in soil and 0.4 ng/L in aqueous samples.

Fluoride Analysis

Approximately 1 g of sand was weighed into a sterile 15 mL centrifuge tube and 4 mL DI (deionized) water was added. The sample was shaken for 48 hours and then centrifuged at 4000 rpm for 20 minutes. 1 mL of supernatant was transferred by pipette into a clean 15 mL centrifuge tube. Samples that were milled with KOH were neutralized with 0.5 µL of $HNO_3$. 1.5 mL of total ionic strength adjustment buffer (TISAB)(available from Fisher Scientific) was added. A calibrated fluoride ion specific electrode (ISE) (available from Fisher Scientific Orion) was placed into the sample and measurement was recorded when the value stabilized.

EQUIVALENTS

It will be understood by those skilled in the art that this description is made with reference to certain embodiments and that it is possible to make other embodiments employing the principles of the invention which fall within its spirit and scope.

TABLE 1

Destruction percentages for all treatments of 23 factorial design in PFOS and PFOA spiked sand samples at 15 min, 1 hour and 4 hours of milling

| DESTRUCTION PERCENTAGES | Milling time | | | | | |
|---|---|---|---|---|---|---|
| Treatment | 15 minutes | | 1 hour | | 4 hours | |
| combination | PFOS | PFOA | PFOS | PFOA | PFOS | PFOA |
| 15 g dry sand with KOH | 45% ± 10% | 82% ± 1% | 73% ± 6% | 90% ± 5% | 81% ± 11% | 96% ± 4% |
| 15 g dry sand, no KOH | 70% ± 18% | 59% ± 8% | 88% ± 9% | 83% ± 16% | 98% ± 0.4% | 99% ± 0.3% |
| 15 g saturated sand with KOH | 22% ± 15% | 74% ± 2% | 39% ± 7% | 74% ± 10% | 54% ± 13% | 83% ± 8 |
| 15 g saturated sand no KOH | Negligible | 29% ± 13% | Negligible | 34% ± 5% | Negligible | 38% ± 9% |
| 40 g dry sand with KOH | 90% ± 6% | 94% ± 1% | 97% ± 10% | 97% ± 5% | 99% ± 0.5% | 99%* |
| 40 g dry sand, no KOH | 59% ± 4% | 65% ± 27% | 76% ± 4% | 70% ± 7% | 92% ± 6% | 88% ± 1% |
| 40 g saturated sand with KOH | 97% ± 15% | 88% ± 2% | 99% ± 24% | 88% ± 11% | 99% ± 13 | 92% ± 2 |
| 40 g saturated sand, no KOH | Negligible | Negligible | Negligible | Negligible | Negligible | Negligible |

* <QL by 4 hours of milling

TABLE 2

Properties of FFTA sands and clays

| ID | Soil type | Depth below ground surface (m) | Initial PFOS concentration (ng/g) | PFOS concentration at specified no. hours of milling (ng/g) |
|---|---|---|---|---|
| S1 | sand | 0-0.4 | 228 ± 10 | 132 ± 43 [a] |
| S2 | sand | 0.1-0.5 | 1538 ± 49 | 673 ± 14 [b] |
| S3 | sand | 0.6-1.0 | 2070 ± 177 | 633 ± 75 [b] |
| C1 | clay | 1.2-1.5 | 639 ± 192 | 100 ± 30 [b] |
| C2 | clay | 1.0-2.2 | 1670 ± 501 | 65 ± 20 [b] |
| C3 | clay | 1.5-2.2 | 639 ± 573 | 245 ± 11 [b] |

[a] 5 hours of milling
[b] 6 hours of milling

TABLE 3

Destruction percentages for FFTA sands and clays after 6 hours of milling

| Media | PFOS | PFOSA | PFHxA | PFPeA | PFBA | PFHxS |
|---|---|---|---|---|---|---|
| S1 | 42% ± 30% | NO DESTRUCTION | <QL by 1 hr | <QL by 1 hr | x | x |
| S2 | 56% ± 2% | NO DESTRUCTION | <QL by 1 hr | x | <QL by 1 hr | 63% ± 17% |

TABLE 3-continued

Destruction percentages for FFTA sands and clays after 6 hours of milling

| Media | PFOS | PFOSA | PFHxA | PFPeA | PFBA | PFHxS |
|---|---|---|---|---|---|---|
| S3 | 69% ± 12% | x | x | x | x | x |
| C1 | 84% ± 5% | x | <QL by 1 hr | x | x | NO DESTRUCTION |
| C2 | 96% ± 1% | x | <QL by 4 hr | <QL by 1 hr | <QL by 1 hr | <QL by 6 hr |
| C3 | 69% ± 1% | x | x | <QL by 1 hr | X | x | x - Not detected in sample.

TABLE 4

PFOS destruction percentages and fluoride recovery at 4 hours of milling.

| Treatment combination | PFOS destruction | Fluoride recovery |
|---|---|---|
| 15 g dry sand with KOH | 85% ± % | 84% ± 11.9% |
| 15 g dry sand, no KOH | 99*% ± % | 11% ± 1.2% |
| 40 g dry sand with KOH | 81% ± % | 89% ± 12.9% |
| 40 g dry sand, no KOH | 84% ± % | 45% ± 3.3% |

*<QL by 4 hours of milling

The invention claimed is:

1. A method for remediating per- and polyfluoroalkyl substances (PFAS)-contaminated soil, comprising:
    disposing PFAS-contaminated soil into a ball mill;
    adding at least one drying agent to the ball mill, and operating the ball mill until a hydration level of the PFAS-contaminated soil is in a selected range;
    disposing a plurality of milling balls in the ball mill; and
    operating the ball mill until a specified PFAS contamination target level is achieved.

2. The method of claim 1, wherein the ball mill is a horizontal ball mill or a long roll ball mill.

3. The method of claim 1, wherein a gas is continuously disposed into the ball mill while the ball mill is operating.

4. The method of claim 3, wherein the gas is air, argon, nitrogen, helium, or a combination of two or more thereof.

5. The method of claim 1, further comprising disposing at least one co-milling agent in the ball mill.

6. The method of claim 5, wherein the co-milling agent comprises potassium hydroxide, sodium hydroxide, calcium oxide, silicon dioxide, sand, granite, quartz porphyries, feldspar, talc, aluminum oxide, porphyries, or a combination of two or more thereof.

7. The method of claim 5, wherein the drying additive comprises sodium chloride, calcium chloride, sodium hydroxide, copper sulphate, phosphorus pentoxide, potassium hydroxide, silica gel, lithium bromide, lithium chloride, or a combination of two or more thereof.

8. The method of claim 5, wherein the co-milling agent is added in a ratio of co-milling agent to PFAS-contaminated soil of about 0:1 to about 1:1.

9. The method of claim 1, wherein the milling balls are added in a mass ratio of milling balls to PFAS-contaminated soil of about 20:1.

10. The method of claim 1, wherein PFAS-contaminated soil comprises one or more of perfluorooctanesulfonic acid (PFOS), perfluorooctanoic acid (PFOA), perfluorooctane sulfonami de (PFOSA), perfluorohexanoic acid (PFHxA), perfluoropentanoic acid (PFPeA), pentafluorobenzoic acid (PFBzA), perfluorobutanoic acid (PFBA), perfluorohexanesulfonic acid (PFHxS), perfluorobutanesulfonic acid (PFBS), perfluorodecanoic acid (PFDA), prefluorododecanoic acid (PFDoA), perfluoroheptanoic acid (PFHpA), perfluorononanoic acid (PFNA), perfluoroundecanoic acid (PFUnA), fluorotelomer and fluorotelomer sulfonate (FTS).

11. The method of claim 1, wherein the PFAS-contaminated soil comprises PFAS in a range of about 0.5 ppb to about 40 ppm.

12. The method of claim 1, wherein the PFAS-contaminated soil comprises bulk natural inorganic matter, bulk natural organic matter, solid material, porous material, concrete, asphalt, or granular activated carbon materials.

13. A method for remediating per- and polyfluoroalkyl substances (PFAS)-contaminated soil, comprising:
    disposing PFAS-contaminated soil into a ball mill;
    disposing a plurality of milling balls in the ball mill prior to rotating the ball mill; and
    operating the ball mill until a specified PFAS contamination target level is achieved,
    wherein the disposing the plurality of milling balls occurs when the PFAS-contaminated soil has attained a selected hydration level.

14. The method of claim 13, wherein the ball mill is a horizontal ball mill or a long roll ball mill.

15. The method of claim 13, wherein a gas is continuously disposed into the ball mill while the ball mill is operating.

16. The method of claim 15, wherein the gas is air, argon, nitrogen, helium, or a combination of two or more thereof.

17. The method of claim 16, wherein the co-milling agent comprises potassium hydroxide, sodium hydroxide, calcium oxide, silicon dioxide, sand, granite, quartz porphyries, feldspar, talc, aluminum oxide, porphyries, or a combination of two or more thereof.

18. The method of claim 13, further comprising disposing at least one co-milling agent in the ball mill.

19. The method of claim 13, wherein the drying additive comprises sodium chloride, calcium chloride, sodium hydroxide, copper sulphate, phosphorus pentoxide, potassium hydroxide, silica gel, lithium bromide, lithium chloride, or a combination of two or more thereof.

20. The method of claim 13, wherein the milling balls are added in a mass ratio of milling balls to PFAS-contaminated soil of about 20:1.

21. The method of claim 13, wherein the co-milling agent is added in a ratio of co-milling agent to PFAS-contaminated soil of about 0:1 to about 1:1.

22. The method of claim 13, wherein PFAS-contaminated soil comprises one or more of perfluorooctanesulfonic acid (PFOS), perfluorooctanoic acid (PFOA), perfluorooctanesulfonamide (PFOSA), perfluorohexanoic acid (PFHxA), perfluoropentanoic acid (PFPeA), pentafluorobenzoic acid (PFBzA), perfluorobutanoic acid (PFBA), perfluorohexanesulfonic acid (PFHxS), perfluorobutanesulfonic acid (PFBS), perfluorodecanoic acid (PFDA), prefluorododecanoic acid (PFDoA), perfluoroheptanoic acid (PFHpA), perfluorononanoic acid (PFNA), perfluoroundecanoic acid (PFUnA), fluorotelomer, and fluorotelomer sulfonate (FTS).

23. The method of claim 13, wherein the PFAS-contaminated soil comprises bulk natural inorganic matter, bulk natural organic matter, solid material, porous material, concrete, asphalt, or granular activated carbon materials.

24. A method for remediating per- and polyfluoroalkyl substances (PFAS)-contaminated soil, comprising:
- disposing PFAS-contaminated soil into a ball mill;
- disposing a plurality of milling balls in the ball mill; and
- operating the ball mill until a specified PFAS contamination target level is achieved, wherein the remediation is conducted in the absence of a hydroxide base.

* * * * *